(12) United States Patent
Wang et al.

(10) Patent No.: US 11,286,587 B2
(45) Date of Patent: Mar. 29, 2022

(54) STEEL CORD

(71) Applicant: NV Bekaert SA, Zwevegem (BE)

(72) Inventors: Yuping Wang, Jiangyin (CN); Tao Huang, Jiangyin (CN)

(73) Assignee: NV BEKAERT SA, Zwevegem (BE)

( * ) Notice: Subject to any disclaimer, the term of this patent is extended or adjusted under 35 U.S.C. 154(b) by 43 days.

(21) Appl. No.: 16/765,972

(22) PCT Filed: Nov. 26, 2018

(86) PCT No.: PCT/EP2018/082568
§ 371 (c)(1),
(2) Date: May 21, 2020

(87) PCT Pub. No.: WO2019/129452
PCT Pub. Date: Jul. 4, 2019

(65) Prior Publication Data
US 2020/0362486 A1  Nov. 19, 2020

(30) Foreign Application Priority Data

Dec. 25, 2017 (WO) ................ PCT/CN2017/118296

(51) Int. Cl.
*D02G 3/48* (2006.01)
*B60C 9/00* (2006.01)
(Continued)

(52) U.S. Cl.
CPC ............. *D02G 3/48* (2013.01); *B60C 9/0007* (2013.01); *D02G 3/12* (2013.01); *D07B 1/0613* (2013.01);
(Continued)

(58) Field of Classification Search
CPC .. D07B 1/0613; D07B 1/0633; D07B 1/0646; D07B 1/0653; D07B 2501/2406; B60C 9/0007; B60C 9/0057
See application file for complete search history.

(56) References Cited

U.S. PATENT DOCUMENTS 5,461,850 A * 10/1995 Bruyneel ............. D07B 1/0613
57/212
5,606,852 A * 3/1997 Yanagisawa ......... D07B 1/0653
152/451

(Continued)

FOREIGN PATENT DOCUMENTS

CN   1133075    10/1996
JP   08-176981   7/1996
(Continued)

OTHER PUBLICATIONS

International Search Report dated Feb. 18, 2019 in International (PCT) Application No. PCT/EP2018/082568.

*Primary Examiner* — Shaun R Hurley
(74) *Attorney, Agent, or Firm* — Wenderoth, Lind & Ponack, L.L.P.

(57) ABSTRACT

The invention provides a steel cord for rubber reinforcement. The steel cord comprises a core strand and at least three outer strands twisted around the core strand, the core strand comprises at least one first core filament and multiple first outer filaments twisted around the first core filament, each outer strand comprises a number of second filaments, at least one of multiple first outer filaments is preformed prior to being twisted into the core strand, and at least one of second steel filaments is straight prior to being twisted to form each outer strand. The steel cord has improved performance on core filament migration.

9 Claims, 2 Drawing Sheets

(51) Int. Cl.
*D02G 3/12* (2006.01)
*D07B 1/06* (2006.01)
*B60C 9/20* (2006.01)

(52) U.S. Cl.
CPC ......... *D07B 1/0633* (2013.01); *D07B 1/0653* (2013.01); *B60C 9/0057* (2013.01); *B60C 2009/2074* (2013.01); *B60C 2200/14* (2013.01); *D07B 2201/2061* (2013.01); *D07B 2205/3025* (2013.01); *D07B 2501/2046* (2013.01)

(56) References Cited

U.S. PATENT DOCUMENTS

| | | | | |
|---|---|---|---|---|
| 5,687,557 A * | 11/1997 | De Vos | | D07B 1/0613 57/214 |
| 5,878,564 A | 3/1999 | De Vos et al. | | |
| 6,311,466 B1 * | 11/2001 | De Vos | | D07B 7/025 57/212 |
| 6,405,774 B1 * | 6/2002 | Komatsu | | D07B 1/0633 152/556 |
| 8,359,823 B2 * | 1/2013 | Qi | | D07B 1/0646 57/212 |
| 8,387,353 B2 * | 3/2013 | Mullebrouck | | D07B 7/025 57/237 |
| 8,966,872 B2 * | 3/2015 | Cheng | | D07B 1/0613 57/311 |
| 9,828,181 B2 | 11/2017 | Hou et al. | | |
| 2002/0096238 A1 * | 7/2002 | Miyazaki | | B60C 9/0057 152/451 |
| 2013/0032264 A1 * | 2/2013 | Cheng | | D07B 1/0646 152/451 |

FOREIGN PATENT DOCUMENTS

| | | |
|---|---|---|
| JP | 2006-022413 | 1/2006 |
| WO | 99/28547 | 6/1999 |
| WO | 2017/166417 | 10/2017 |

* cited by examiner

STEEL CORD

TECHNICAL FIELD

The invention relates to a steel cord for rubber reinforcement. The invention also relates to a tire reinforced by steel cords.

BACKGROUND ART

The steel cord for reinforcing the heavy load tire, such as off-the-road tire, is required to have high strength, as a result, the steel cord has multiple strands with multiple filaments for reaching high strength, and such steel cord is so-called OTR cord.

Normally an OTR cord has a multiple strands structure, and this makes the steel cord having high strength and high breaking load.

During the use or the running of a heavy load tire, the OTR cords are subjected to very heavy load which gives strong force to the core filament in the core strand of the OTR cord, and sometimes this strong force makes the core filament migrating out from the rubber layers and thereafter exposing to the air (so-called core filament migration), and this makes the steel cord strength being worse and leads to a corrosion problem since the core filament migration causes the moisture to penetrate into the rubber layers and to corrode the steel cords.

JP2006022413 discloses a steel cord having a core strand and a number of sheath strands, in the core strand the core filament is thicker than the sheath filaments and the core filament is wavy preformed. By doing so, the migration of the core filament is improved.

Disclosure of Invention

One object of the invention is to provide a steel cord with better performance.

Another object of the invention is to provide a tire reinforced by the steel cords.

According to the first object, a steel cord for rubber reinforcement is provided, the steel cord comprises a core strand and at least three outer strands twisted around the core strand, the core strand comprises at least one first core filament and multiple first outer filaments twisted around the at least one first core filament, each outer strand comprises a number of second filaments, at least one of the first outer filaments is preformed prior to being twisted into the core strand, and at least one of the second steel filaments is straight prior to being twisted to form each outer strand.

By providing a preformation to at least one of the first outer filaments, the migration of the first core filament is reduced because of the significantly improved anchorage force of the first core filament.

Preferably all of the first outer filaments are preformed prior to being twisted into the core strand. This leads to higher anchorage force of the first core filament and thereafter reduces the risk of core filament migration when embedding the steel cords into a rubber layer of a tire.

Preferably the at least one first core filament is preformed prior to being twisted into the core strand.

Preferably all of second steel filaments are straight prior to being twisted to form the outer strand.

"Straight" means the steel filament in the final steel cord is a filament that has undergone a deformation only by the twisting process starting from a straight filament and ending with a filament following a helix path or more helix paths imposed one upon the other. "Straight" does not mean the steel filament is an absolutely straight line in the final steel cord. The "straight" second steel filament has a helix path along its length when being untwisted from the final steel cord, this is because of the twisting process but without any other additional plastic deformation.

"Preformed" means the steel filament, i.e. the first outer filament, is in the final steel cord a filament that has undergone not only a deformation by the twisting process but, in addition, some additional plastic deformation, so that it deviates from the path of a straight filament. The additional plastic deformation could be single crimping deformation, double crimping deformation in two different planes as described in WO99/28547, polygonal deformation as described in CN1133075 and other known deformation type. When being untwisted from the final steel cord the "preformed" filament in the final steel cord has small waves that are the result of additional plastic deformation in addition to a helix path along its length. The first core filament in the core strand is an exception since it is not subjected to a twisting process as it is in the core, in other words, the preformed first core filament only has small waves along its length but no helix path.

When untwisting the preformed first outer filament from the steel cord, the preformed first outer filament comprises continuous waves A and continuous waves B along its length. Both waves A and waves B are caused by combined effects of preforming deformation and twisting process, waves A are mainly caused by preforming deformation in addition to the twisting process while waves B are mainly caused by twisting process in addition to the preforming deformation. Preferably wave A has a wave height ranging from $1.05 \times d_1$ to $4 \times d_1$ mm, $d_1$ being the diameter of the first outer filament, wave B has a wave height ranging from $0.5 \times D_1$ to $1.5 \times D_1$ mm, $D_1$ being the diameter of the enveloping circle of the first outer filament, here enveloping circle is a smallest circle covering all the first outer filaments at one cross-section of the steel cord. More preferably wave A has a wave height ranging from $1.05 \times d_1$ to $3.5 \times d_1$ mm, and wave B has a wave height ranging from $0.7 \times D_1$ to $1.2 \times D_1$ mm. If wave height is too large, the steel cord strength will be too low; and if the wave height is too low, the anchorage force of the first core filament will be too small.

When untwisting the preformed first core filament from the steel cord, the preformed first core filament comprises continuous waves C which are the result of preforming deformation along its length. Preferably wave C has a wave height ranging from $1.05 \times d_2$ to $4 \times d_2$ mm, $d_2$ being the diameter of the first core filament. More preferably, wave C has a wave height ranging from $1.05 \times d_2$ to $3.5 \times d_2$ mm.

Wave height is measured by a profile projector. The filament is untwisted from the steel cord and cut to be with a length of 100-150 mm for being a sample of wave height measurement, and it should be ensured that the plane of the sample to be projected has the biggest wave height before measuring. When the sample or the filament is projected, wave height is measured by firstly drawing a line between two adjacent wave crests, and then measuring the shortest distance from the wave trough which is between the two adjacent wave crests to the line. This short distance is the wave height, including the steel filament diameter.

A wrap filament is wrapped around the outer strands to fix the form of the steel cord.

The strands including the core strand and the outer strand may have two-layered structure or three-layered structure. The two-layered structure includes a core layer where the first core filament is in and an outer layer where the first outer filament is in, while the three-layered structure includes a core layer an outer layer and an intermediate layer. In case of more than two layers the filaments in the intermediate layer are also defined as the first outer filaments and are preferably preformed prior to being twisted into the core strand.

The steel cord may have any known structure, like 7×7+1, 7×(1+6+12)+1, (1+6)+6×(3+9+15) or (1+6+12)+6×(3+9+15).

According to the second object of the invention, an off-the-road tire is provided, the tire comprises multiple belt layers and carcass, wherein the belt is reinforced by the steel cords, at least one of the steel cords comprises a core strand and at least three outer strands twisted around the core strand, the core strand comprises at least one first core filament and multiple first outer filaments twisted around the at least one first core filament, each outer strand comprises a number of second filaments, at least one of the first outer filaments is preformed prior to being twisted into the core strand, and at least one of the second steel filaments is straight prior to being twisted to form each outer strand.

The off-the-road tire has the reduced risk of core filament migration and thereof has better quality and longer lifetime.

BRIEF DESCRIPTION OF FIGURES IN THE DRAWINGS

MODE(S) FOR CARRYING OUT THE INVENTION

Figure 1:
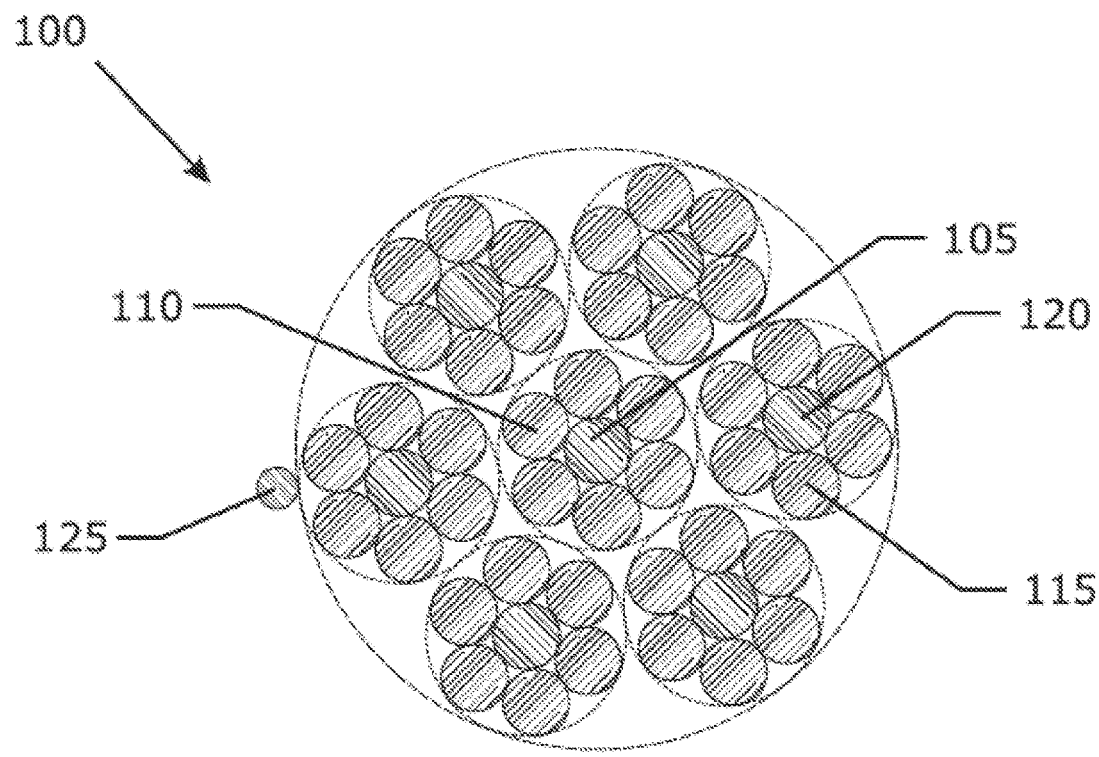
FIG. 1 shows a steel cord with a structure of 7×7+1.
Figure 2:
FIGS. 2-5 show the preformed steel filament and the straight steel filament which are untwisted from a steel cord
Figure 3:
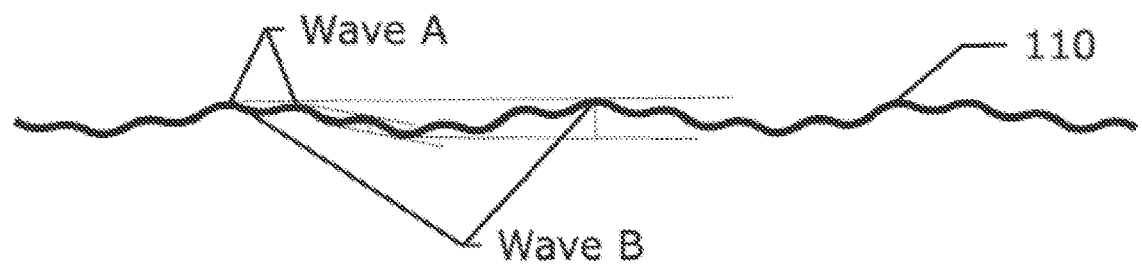
Figure 4:
Figure 5:

The steel filaments for a steel cord are made from a wire rod.

The wire rod is firstly cleaned by mechanical descaling and/or by chemical pickling in a $H_2SO_4$ or HCl solution in order to remove the oxides present on the surface. The wire rod is then rinsed in water and is dried. The dried wire rod is then subjected to a first series of dry drawing operations in order to reduce the diameter until a first intermediate diameter.

At this first intermediate diameter, e.g. at about 3.0 to 3.5 mm, the dry drawn steel wire is subjected to a first intermediate heat treatment, called patenting. Patenting means first austenitizing until a temperature of about 1000° C. followed by a transformation phase from austenite to pearlite at a temperature of about 600-650° C. The steel wire is then ready for further mechanical deformation.

Thereafter the steel wire is further dry drawn from the first intermediate diameter until a second intermediate diameter in a second number of diameter reduction steps. The second diameter typically ranges from 1.0 mm to 2.5 mm.

At this second intermediate diameter, the steel wire is subjected to a second patenting treatment, i.e. austenitizing again at a temperature of about 1000° C. and thereafter quenching at a temperature of 600 to 650° C. to allow for transformation to pearlite.

If the total reduction in the first and second dry drawing step is not too big a direct drawing operation can be done from wire rod till second intermediate diameter.

After this second patenting treatment the steel wire is usually provided with a brass coating: copper is plated on the steel wire and zinc is plated on the copper. A thermodiffusion treatment is applied to form the brass coating. Alternatively, the steel wire can be provided with a ternary alloy coating, including copper, zinc and a third alloy of cobalt, titanium, nickel, iron or other known metal.

The brass coated or ternary alloy coated steel wire is then subjected to a final series of cross-section reductions by means of wet drawing machines. The final product is a steel wire with a carbon content above 0.60 percent by weight, e.g. higher than 0.70 percent by weight, or higher than 0.80 percent by weight, or even higher than 0.90 percent by weight, with a tensile strength typically above 2000 MPa, e.g. above 3800-2000 d Mpa, or above 4100-2000 d MPa or above 4400-2000 d MPa (d is the diameter of the steel wire) and adapted for the reinforcement of elastomer products.

Steel wires adapted for the reinforcement of tyres typically have a final diameter ranging from 0.05 mm to 0.60 mm, e.g. from 0.10 mm to 0.40 mm. Examples of filament diameters are 0.10 mm, 0.12 mm, 0.15 mm, 0.175 mm, 0.18 mm, 0.20 mm, 0.22 mm, 0.245 mm, 0.28 mm, 0.30 mm, 0.32 mm, 0.35 mm, 0.38 mm, 0.40 mm.

After the preparation of the steel filaments, at least one steel filament which will be located in the outer layer of the core strand, preferably all the steel filaments in the outer layer of the core strand, is subjected to a preforming process, and then all the steel filaments are subjected to the twisting process to form a steel cord.

The preforming process is single crimping, double crimping in two different planes, or polygonal preforming. Preferably, it is a single crimping since it leads less strength loss to the steel filament.

FIG. 1 illustrates a first embodiment. The steel cord 100 has a structure of 7×7+1, the first core filament 105 and the first outer filaments 110 are preformed prior to the twisting process, and each outer strand has the filaments 115 and the filament 120 which is in the core of the outer strand, the filaments 115 and 120 are straight prior to the twisting process, a filament 125 is wrapped around the outer strands. FIGS. 2-5 show the different wave form of the filament 105, 110, 115 and 120. Wave C, the wave form of the filament 105, is caused by preforming deformation only. Wave A, the smaller wave form of the filament 110, is caused by preforming deformation mainly in addition to twisting process. Wave B, the bigger wave form of the filament 110, is caused by twisting process mainly in addition to preforming deformation. The wave forms of the filament 115 and 120 are caused by twisting process only, the wave form of the filament 115 and the wave form of the filament 120 have different wave height since the filament 115 and the filament 120 have the different twisting process. As shown in FIGS. 2-5, wave height is measured by firstly drawing a line between two adjacent wave crests when the filament is projected by a profile project, and then measuring the shortest distance from the wave trough to the line (see the example of Wave A, Wave B and Wave C). This short distance is the wave height, including the steel filament diameter.

A comparison test is done. Table 1 summarizes the result.

TABLE 1

|  | First embodiment | Reference 1 | Reference 2 |
|---|---|---|---|
| Structure | 7 × 7 + 1 | 7 × 7 + 1 | 7 × 7 + 1 |
| Filament diameter in the core strand and the outer strands (mm) | 0.25 | 0.25 | 0.25 |
| Preformed filament | first core filament and first outer filaments | first core filament | no |
| Straight filament | second filaments | first outer filaments and second filaments | all filaments of the steel cord |
| Preforming type | single crimping | single crimping | no |
| Average wave height of wave A (mm) | 0.358 | no | no |
| Average enveloping circle diameter D1 (mm) | 0.75 | 0.75 | 0.75 |
| Average wave height of Wave B (mm) | 0.664 | 0.658 | 0.662 |
| Average wave height of wave C (mm) | 0.329 | 0.336 | no |
| Core filament anchorage force (N) | 135 | 11 | 9 |

The core filament anchorage force is tested by a method with the following steps: firstly, make a rubberized sample embedded with the 4 steel cords which are arranged in parallel, the distance between two adjacent steel cords is 5 mm measured from the center of one steel cord to the center of another steel cord, the rubberized sample has a size of 220×25×15 mm (length×width×height); secondly, select one end of the rubberized sample, remove the rubber compound of the selected end and leave the steel cords in, and ensure the rest of the rubberized sample having a length of one inch; thirdly, unravel the outer strands and the first outer filaments from the steel cords of the selected end to expose the first core filaments; fourthly, pull one of the first core filaments out of the rubberized sample and record the required force. The recorded force is the core filament anchorage force.

From the above table, it is clear that the invention steel cord has quite high improvement on core filament anchorage force compared with the reference. The anchorage force of preforming the first outer filaments is 10 times higher than the anchorage force of preforming the first core filament only. The improved anchorage force reduces the risk of core filament migration.

A second embodiment is a 7×(1+6+12) steel cord. Each strand of the steel cord has three layers structure, a core, an intermediate layer and an outer layer. The filaments in the intermediate layer and the outer layer are preformed prior to the twisting process, and the rest filaments of the steel cord are straight prior to the twisting process. The preformed first outer filaments comprise continuous waves A and continuous waves B along its length, wave A has a wave height of 0.290 mm and wave B has a wave height of 0.558 mm.

The invention claimed is:

1. A steel cord for rubber reinforcement, said steel cord comprising a core strand and at least three outer strands twisted around said core strand, said core strand comprising at least one first core filament and multiple first outer filaments twisted around said at least one first core filament, each said outer strand comprising a number of second filaments, wherein at least one of said multiple first outer filaments is preformed prior to being twisted into said core strand, and at least one of said a number of second steel filaments is straight prior to being twisted to form each said outer strand, wherein the preformed first outer filament comprises continuous waves A and continuous waves B along its length, said wave A is different from said wave B in wave height, said wave A has a wave height ranging from $1.05 \times d_1$ to $4 \times d_1$ in mm, $d_1$ being the diameter of said first outer filament, said wave B has a wave height ranging from $0.5 \times D_1$ to $1.5 \times D_1$ in mm, $D_1$ being the diameter of the enveloping circle of said first outer filaments.

2. The steel cord as claimed in claim 1, wherein all of said multiple first outer filaments are preformed prior to being twisted into said core strand.

3. The steel cord as claimed in claim 1, wherein said at least one first core filament is preformed prior to being twisted into said core strand.

4. The steel cord as claimed in claim 3, wherein the preformed first core filament comprises continuous waves C along its length, said wave C has a wave height ranging from $1.05 \times d_2$ to $4 \times d_2$ in mm, $d_2$ being the diameter of said first core filament.

5. The steel cord as claimed in claim 4, wherein said wave C has a wave height ranging from $1.05 \times d_2$ to $3.5 \times d_2$ in mm.

6. The steel cord as claimed in claim 1, wherein all of said a number of second steel filaments are straight prior to being twisted to form said outer strand.

7. The steel cord as claimed in claim 1, wherein the preforming onto said first core filament or said first outer filament is single crimping, double crimping in two different planes, or polygonal preforming.

8. The steel cord as claimed in claim 1, wherein said wave A has a wave height ranging from $1.05 \times d_1$ to $3.5 \times d_1$ in mm, said wave B has a wave height ranging from $0.7 \times D_1$ to $1.2 \times D_1$ in mm.

9. An off-the-road tire, comprising multiple belt layers and carcass, wherein said belt layers are reinforced by said steel cords as claimed in claim 1.

* * * * *